US006456306B1

United States Patent
Chin et al.

(10) Patent No.: US 6,456,306 B1
(45) Date of Patent: Sep. 24, 2002

(54) METHOD AND APPARATUS FOR DISPLAYING HEALTH STATUS OF NETWORK DEVICES

(75) Inventors: Jeff Chin, Belmont; Hanh Tran, San Jose; Leon Leong, Palo Alto, all of CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/668,586

(22) Filed: Sep. 22, 2000

Related U.S. Application Data

(63) Continuation of application No. 08/496,191, filed on Jun. 8, 1995.

(51) Int. Cl.[7] .................................................. G09G 5/08
(52) U.S. Cl. ...................... 345/810; 345/853; 345/866; 345/825; 345/804; 345/835; 345/977; 345/792; 709/224
(58) Field of Search .................... 345/810, 764–765, 345/788, 789, 792, 769, 804–805, 835–839, 855, 853, 977, 825, 811, 840; 370/401; 709/223–224; 716/11

(56) References Cited

U.S. PATENT DOCUMENTS

| | | | |
|---|---|---|---|
| 4,817,080 A | 3/1989 | Soha | 370/252 |
| 5,049,873 A | 9/1991 | Robins et al. | 340/825.01 |
| 5,109,486 A | 4/1992 | Seymour | 709/224 |

(List continued on next page.)

OTHER PUBLICATIONS

Cisco Systems, "Cisco 4000 Router", Product Brief, 1993, pp. 1–1 to 1–4.
Synoptics Communications, Inc., "Optivity Network Management System", Product Brochure, 1992.

*Primary Examiner*—Richard Hjerpe
*Assistant Examiner*—Francis Nguyen
(74) *Attorney, Agent, or Firm*—Blakely Sokoloff Taylor & Zafman LLP

(57) ABSTRACT

A method and apparatus for concurrently displaying from a single window on a network management station the health status of all network devices and objects of a computer network. The network devices may be categorized according to state or device type, as determined by the network manager. The method and apparatus provides a network manager with the ability to determine the current state of network devices and objects within an enterprise network and invoke further actions such as configuration, performance, fault, and security management tasks. The network manager can drag and drop icons from one network management system application window to another network management system application window to obtain fault information about network devices and objects, thus allowing multiple network management system applications to run concurrently on the same network management station. The network manager is further able to add new network devices and objects by dragging site, folder or device icons from one network management system application window to a second network management system application window for displaying the health status of the new devices. The dragged-in devices are added to the appropriate status panes within the second window according to the method of the present invention.

27 Claims, 8 Drawing Sheets

U.S. PATENT DOCUMENTS

| | | | |
|---|---|---|---|
| 5,185,860 A | 2/1993 | Wu | 709/224 |
| 5,196,838 A | 3/1993 | Meier et al. | 345/684 |
| 5,226,120 A | 7/1993 | Brown et al. | 709/224 |
| 5,261,044 A | 11/1993 | Dev et al. | 345/855 |
| 5,276,789 A | 1/1994 | Besaw et al. | 345/853 |
| 5,295,244 A | 3/1994 | Dev et al. | 345/853 |
| 5,315,580 A | 5/1994 | Phaal | 370/232 |
| 5,414,809 A | 5/1995 | Hogan et al. | 345/765 |
| 5,471,399 A | 11/1995 | Tanaka et al. | 716/11 |
| 5,572,640 A | 11/1996 | Schettler | 345/853 |
| 5,649,132 A * | 7/1997 | Fumarold et al. | 345/792 |
| 5,819,028 A * | 10/1998 | Manghirmalani et al. | 714/57 |
| 5,825,775 A * | 10/1998 | Chin et al. | 370/401 |
| 6,115,743 A * | 9/2000 | Cowan et al. | 709/224 |

* cited by examiner

Fig. 3 *(PRIOR ART)*

Fig. 7
| OBJECT ICON | OBJECT NAME |
---
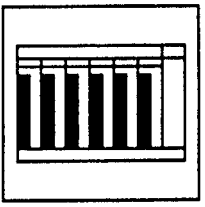 SYNOPTICS HUB
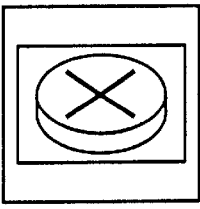 SYNOPTICS SWITCH — 701
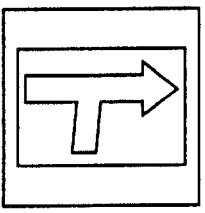 SYNOPTICS OR GENERIC ROUTER
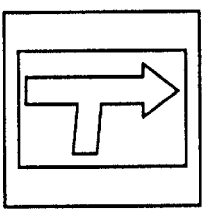 WELLFLEET ROUTER
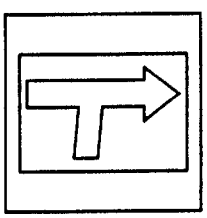 CISCO ROUTER
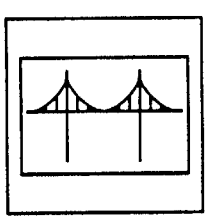 SYNOPTICS BRIDGE

METHOD AND APPARATUS FOR DISPLAYING HEALTH STATUS OF NETWORK DEVICES

CROSS-REFERENCES TO RELATED APPLICATIONS

This is a continuation of U.S. patent application (application Ser. No. 08/496,191) filed Jun. 8, 1995.

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to the field of computer networking, specifically to the field of network management systems for displaying information regarding network devices and objects of an enterprise-wide computer network.

2. Description of the Related Art

Computer networks are growing at a rapid pace. Businesses are continually adding new workgroups to their existing computer networks. Often these computer networks are spread across organizational and geographical boundaries forming enterprise-wide networks, or simply, enterprise networks. FIG. 1 illustrates enterprise network 100 that may include Ethernet, token ring, and fiber distributed data interface (FDDI) local area networks (LANs) that consist of high-speed backbones, geographically dispersed networks, network devices such as switches (102), routers 104(a) and 104(b), bridges 106(a) and 106(b), hubs 108(a) through 108(e), servers and end-user workstations, and a variety of cabling media.

As computer networks expand and become more complex, forming enterprise networks, network management systems are employed to maximize the control, efficiency and performance of the enterprise network. Network management systems allow a network manager using a management station 110 to automate the management of diverse, multivendor enterprise networks. Network management systems such as Optivity™, a suite of graphical network management applications from Bay Networks, Incorporated, the assignee of the present invention, can manage activity on an enterprise network from a single management station. Optivity operates on a UNIX-based network management station and can be used with SunSoft SunNet Manager from Sun Microsystems, Incorporated, HP OpenView Network Node Manager (NMM) from Hewlett-Packard, Incorporated, and IBM AIX System View NetView/6000 from International Business Machines (IBM), Incorporated. Optivity displays information in the OSF/MOTIF™ or SunOS OPEN LOOK graphical user interfaces (MOTIF is a trademark of the Open Software Foundation). Optivity, for example, allows the network manager to monitor and manage an entire enterprise network as one system, from the enterprise level down to the network device level.

Network management systems typically provide a method for locating and identifying, i.e., discovering, network devices and objects (e.g., network segments) and producing a network topology map therefrom. Once the topology map is created, the map may be used to 1) provide a blueprint of the network, 2) obtain an inventory of network devices in the network, 3) locate a network device or object and obtain information about its physical location and status, 4) locate a network device in order to configure it, and 5) launch a network management application to perform configuration, performance, fault, and security management tasks on a selected network device or object.

However, given the size of today's enterprise networks, network maps can be so complicated that it is difficult to determine the physical and geographical relationships of the network devices and objects indicated by the map. FIG. 2 depicts a topology map 200 graphically displaying an enterprise network including, for example, routers, IP subnets and LAN segments, according to Internet View, an Optivity topology viewing tool. Indeed, the network depicted in topology map 200 is visible in the window only by scrolling the window up or down, so that at any one time, the entire enterprise network cannot be viewed. What is needed is a method for presenting information regarding the physical and geographical relationships of network devices in such a way that, even for complex networks, the network manager can view the health status of the network at a glance.

An example of a tool that provides information regarding the physical and geographical relationships of network devices is the Enterprise Command Center module, an Optivity tool used to manage enterprise networks. With reference to FIG. 1, the Enterprise Command Center logically divides the network devices and objects of an enterprise network into a plurality of sites, for example, sites 101(a), 101(b) and 101(c). As illustrated in FIG. 3, the network manager, using the Enterprise Command Center graphical user interface (GUI), obtains better visibility of the network from the site level down to the device level within a single window 300. By selecting a site at site pane 310, the network manager is then able to select a particular type of device or object folder, e.g., a hub folder, from resources pane 320. Selecting a folder from resources pane 320 displays all network devices of the type indicated by that folder, e.g., of the type hub, at the contents pane 330. This visibility into the network allows the network manager to quickly navigate to a particular network device or object according to device type to initiate configuration, performance, fault, and security management tasks. A cursor control device such as a mouse may be used to click and drag a network device icon from contents pane 330 and drop the icon on one of a number of tool icons available in the tools bar 340 to initiate, or launch, one of the aforesaid tasks represented by the tool icon.

Another difficulty that arises given a topology map of a large, complex enterprise network is the ability to quickly navigate to a particular network device or object to initiate configuration, performance, fault, and security management tasks. Commonly, tools for performing configuration, performance, fault, and security management tasks or simply obtaining further network device information are available to the network manager via the network management system. One well-known example of a tool that performs such functions is the RouterMan™ network management tool. RouterMan, operates either as a standalone application or together with the Optivity package of network management applications available from Bay Networks, Incorporated. Generally, Expanded View, a feature of RouterMan, allows the network manager to launch additional sessions that provide further options for monitoring individual routers. Each instance of a RouterMasn Expanded View session creates a window on the network management station display device. Importantly, this window allows the network manager to monitor and perform tasks for only one router. U.S. patent application Ser. No. 08/110,412, filed Aug. 20, 1993, entitled, "Method and Apparatus for Logically Viewing a Router or Similar Device in a Data Network", which application is assigned to the assignee of the present invention and is incorporated herein by reference, further describes certain aspects of monitoring, viewing and altering information regarding individual network devices.

RouterMan Expanded View uses multiple sessions operating concurrently, each creating a separate window to provide information for a like number of network devices. What is needed is a scalable tool that is able to provide health status information regarding multiple network devices from a single session. Moreover, heretofore such tools were device-centric, i.e., they provided health status information for multiple network devices, but only for the same type of devices, e.g., routers. For example, with reference to FIG. 4, System Monitor, a RouterMan tool, may be used to monitor the health status of an entire network or subset of routers from a single window 400 on the network management station display device.

As FIG. 4 shows, the RouterMan System Monitor window 400 includes four health status panes: 1) critical status pane 410, 2) warning status pane 420, 3) acknowledge status pane 430, and 4) operational status pane 440. The location of a router icon in one of the health status panes indicates the overall health of the router, as a function of the health of the protocols and interfaces operating in the router, as defined by default or configured fault thresholds assigned thereto.

Tools bar 450 is used to perform an action on a selected router. To perform one of the actions in tools bar 450, the network manager selects a router icon (e.g., router icon 411) by clicking on router icon 411 with a cursor control device such as a mouse, and dragging router icon 411 on to a tool icon within tools bar 450. As the network manager drops, i.e., releases, the router icon on to a tool icon within the tools bar 450, the action takes place or a dialog box is displayed to enable the manager to complete the action. For example, dragging router icon 411 from critical status pane 410 to expand tool icon 451 in tools bar 450 launches a RouterMan Expanded View monitoring session for the particular router represented by router icon 411.

However, what is needed is a tool that embraces a system model in which all network devices can be simultaneously monitored from a single session at the network management station instead of the device-centric model as, for example, illustrated in FIG. 4.

Furthermore, network devices should be grouped according to a network manager defined criteria such as, for example, status or device type.

Additionally, a tool should provide an intuitive interface by which other operations can be invoked for a given network device or object so that more detailed information may be obtained in order to resolve a fault or problem with the given device or object.

SUMMARY OF THE DISCLOSURE

A method and apparatus for concurrently displaying from a single window on a network management station the health status of all network devices and objects of a computer network is disclosed. The network devices may be categorized according to state or device type, as determined by the network manager. The method and apparatus provides a network manager with the ability to quickly determine the current state of network devices and objects within an enterprise network and invoke further actions such as configuration, performance, fault, and security management tasks using intuitive graphical user interface features.

It is a further object of the present invention to allow the network manager to drag and drop icons from one network management system application window to another network management system application window to obtain fault information about network devices and objects, thus allowing multiple network management system applications to run concurrently on the same network management station.

Another object of the present invention is to allow the network manager to add new network devices and objects by dragging site, folder or device icons from one network management system application window to a second network management system application window for displaying the health status of the new devices. The dragged-in devices are added to the appropriate status panes within the second window according to the method of the present invention.

The aforementioned and further objects, features and advantages of the present invention will be apparent from the description and figures which follow below.

BRIEF DESCRIPTION OF THE DRAWINGS

The present invention is illustrated by way of example and not limitation in the following figures. Like references indicate similar elements, in which:

FIG. 7 is a list of example network device icons used by an embodiment of the present invention.

DETAILED DESCRIPTION OF THE EMBODIMENTS OF THE INVENTION

Overview

The present invention describes a method and apparatus for displaying concurrently from a single window the health status of all network devices and objects in an enterprise network. In the following detailed description, for purposes of explanation, numerous specific details are set forth describing specific representations of data, specific hardware platforms upon which certain components may be implemented, method steps, etc., in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Network Management Station Configuration

Figure 5:
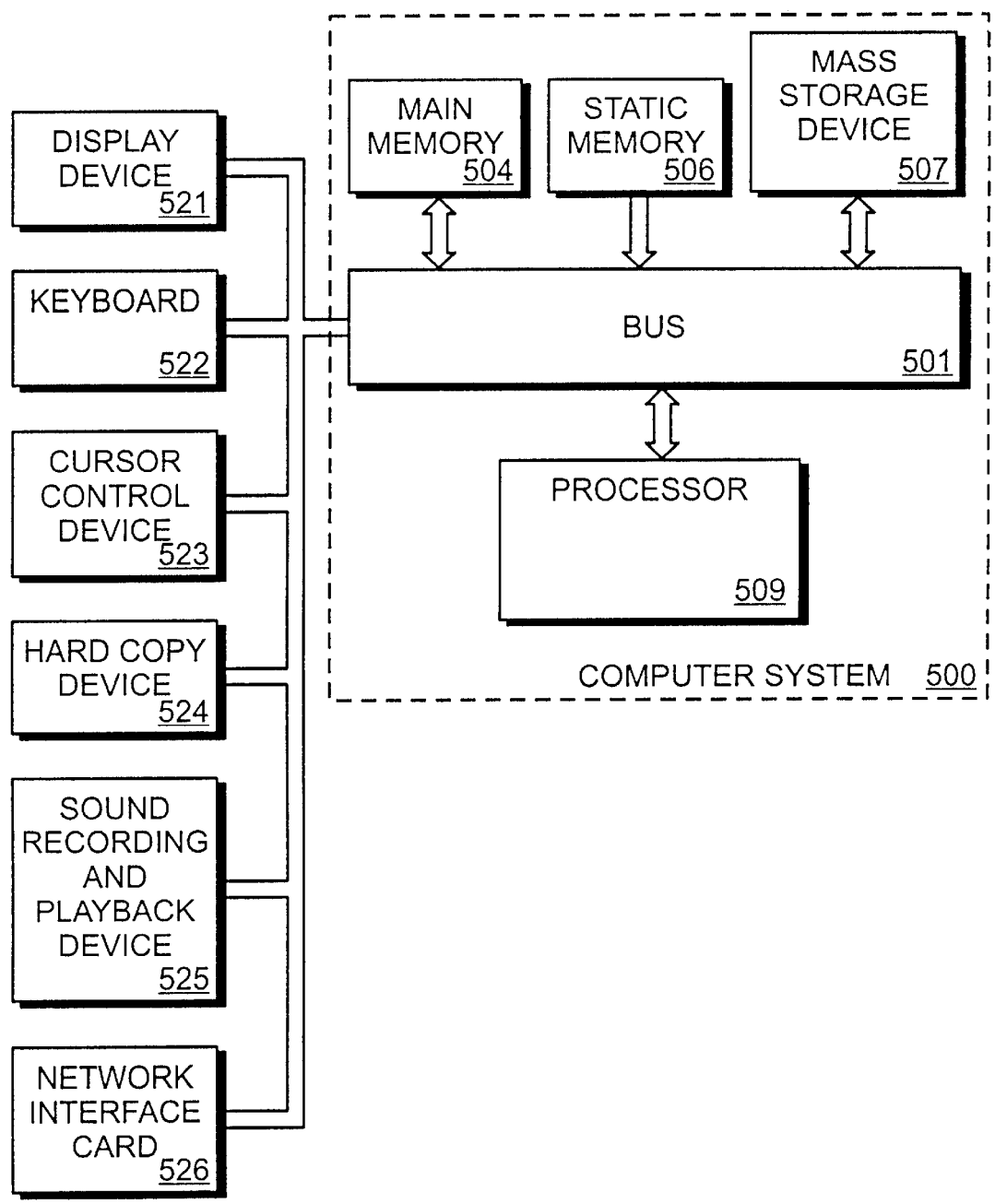
FIG. 5 illustrates a computer system upon which an embodiment of the present invention may be implemented.

Referring to FIG. 5, a network management station upon which an embodiment of the present invention may be implemented is shown. Computer system 500 comprises a bus 501, or other communications hardware and software, for communicating information, and a processor 509 coupled with bus 501 for processing information. System 500 further comprises a random access memory (RAM) or other dynamic storage device 504 (referred to as main memory), coupled to bus 501 for storing information and instructions to be executed by processor 509. Computer system 500 also comprises a read only memory (ROM) 506, and/or other static storage device, coupled to bus 501 for storing static information and instructions for processor 509. Mass storage device 507 is coupled to bus 501 for storing information and instructions. In one embodiment, mass storage device 507 includes a library of graphical images used to generate views of various network devices.

Furthermore, mass storage device 507, such as a magnetic disk or optical disk, and its corresponding disk drive, can be coupled to computer system 500. Computer system 500 can also be coupled via bus 501 to a display device 521 for displaying information to a computer user such as a network manager. Display device 521 is used to display windows containing views of network devices and objects/Display device 521 can include a frame buffer, specialized graphics rendering devices, a cathode ray tube (CRT), and/or flat pane display. An alphanumeric input device 522, including alphanumeric and other keys, is typically coupled to bus 501 for communicating information and command selections to processor 509. Another type of user input device is cursor control device 523, such as a mouse, a trackball, a pen, a touch screen, or cursor direction keys for communicating direction information and command selections to processor 509, and for controlling cursor movement on display device 521. This input device typically has two degrees of freedom in two axes, a first axis (e.g., the x-axis) and a second axis (e.g., the y-axis), which allows the device to specify positions in a plane. However, this invention should not be limited to input devices with only two degrees of freedom.

Another device that may be coupled to bus 501 is a hard copy device 524 which may be used for printing instructions, data, or other information on a medium such as paper, film, or similar types of media. Additionally, computer system 500 can be coupled to a device for sound recording, and/or playback 525, such as an audio digitizer coupled to a microphone for recording information. Further, the device may include a speaker that is coupled to a digital to analog (D/A) converter for playing back the digitized sounds.

Network interface card 526 is coupled to bus 501. Network interface card is further coupled to an external computer network (not shown). Network interface card 526, in conjunction with appropriate data communications protocols (e.g., the TCP/IP suite of internetworking protocols), provide the means by which a network management system operating on computer system 500 exchanges information with other devices coupled to the same computer network.

Computer system 500 and network management application software stored and executed therein as part of the network management system fully support Simple Network Management Protocol (SNMP). Commercially available computer systems implementing the features of computer system 500 include a broad range of UNIX or other operating system-based computers or workstations, including, but not limited to, Sun SPARCstations, Hewlett-Packard Apollo 9000 Series workstations, and IBM RS/6000 workstations. 0Furthermore, the present invention may be used in conjunction with, for example, SunConnect SunNet Manager, HP OpenView Network Node Manager (NMM), or IBM NetView/6000 network management platforms to yield an operational network management station platform upon which an embodiment of the present invention may be implemented.

Fault Management Systems

Network users rely heavily on their data network to perform their jobs. As the number of network users grows, the cost of network down time increases. Fault management, one aspect of network management, allows a network manager to quickly detect and fix network problems with no significant down time.

In a computer network that supports SNMP, SNMP device agents send an SNMP trap in the form of an unsolicited message to notify a network management station when an event has occurred. For example, a SNMP device agent within a hub sends an auto-partition trap when a module or port of the hub is partitioned or wrapped, i.e., disconnected from the network.

All SNMP device agents that support Management Information Base II (MIB II) automatically send a trap to a network management station whenever any of the following conditions occur: cold start or warm start of a device, link down, link up, failure of authentication, and Exterior Gateway Protocol (EGP) neighbor loss. With such event-driven fault management systems, however, network managers can be flooded with redundant and noncritical traps such as, for example, each time an end user logs on to a end user system.

By employing more sophisticated fault management systems, network managers can set thresholds for critical devices, such as hubs or routers, to send traps when a threshold is exceeded. For example, a network manager could configure a hub to send a trap when the error rate for a link is exceeded. However, even if the fault management system supports threshold traps, it may still not reflect current status on the network devices if it relies solely on event-driven traps. Thus, an embodiment of the present invention allows the network manager to monitor the current state of the network and its devices in order to quickly detect network faults, isolate the cause of the fault, verify the fault, and resolve the underlying problem causing the fault to be reported, if possible.

Embodiment of the Present Invention

Figure 6:
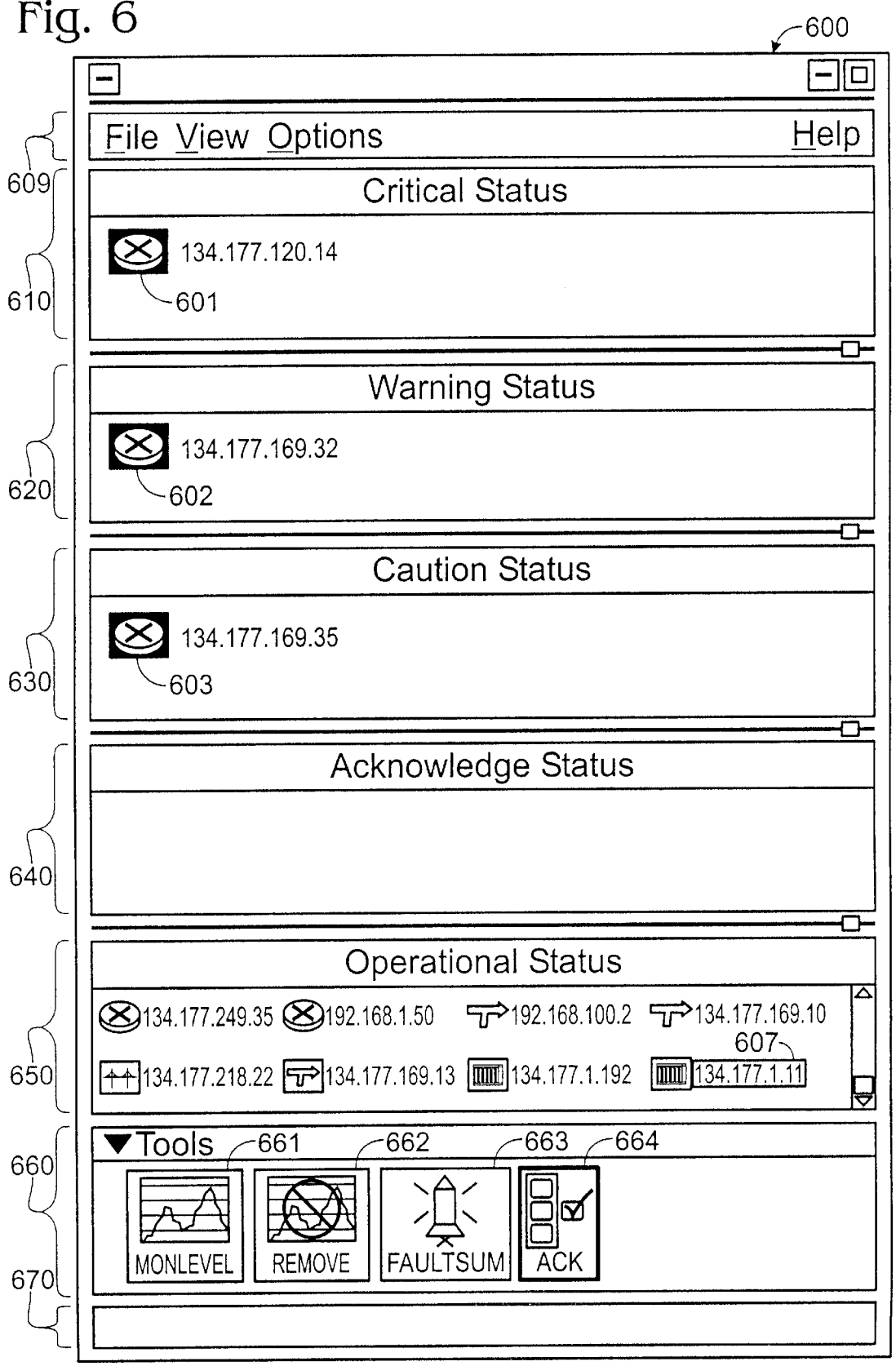
FIG. 6 is a graphical user interface embodied by the present invention.

With reference to FIG. 6, a graphical user interface for an embodiment of the present invention is shown. Window 600 of the present invention uses colored network device icons (e.g., 601–603) and status panes (610–650) to report the current operational state of the devices in the network or within a selected network site. With just a glance, window 600 indicates to the network manager that network device icons 601, 602 and 603 are currently experiencing problems. The network manager can quickly display detailed information on fault reports that have been created for any device displayed in window 600, e.g., the device represented by device icon 601, by simply clicking on the device icon, i.e., selecting the device icon with cursor control device 523, such as a mouse, and dragging the icon from a status pane, e.g., critical status pane 610, to FaultSum tool 664 in tools bar 660. A fault summary application is thereby launched and displays a detailed list of fault reports for the selected device.

The present invention is, in general, directed to fault management. As such, the present invention helps identify and resolve network problems called faults. Window 600 of the present invention enables the network manager to monitor the health of all devices and objects in the network, and quickly identify and fix network problems. An embodiment of the present invention may be implemented as a standalone application or used in conjunction with other network management system applications such as configuration management, performance management, and security management, as an integrated set of network management system applications, thereby allowing the network manager to effectively monitor and manage errors occurring in the enterprise network from a single network management station. For example, an embodiment of the present invention may be operated on the same network management station in conjunction with the Enterprise Command Center module and other tools that comprise the Optivity suite of network management system applications available from Bay Networks, Incorporated.

Each network device displayed in window 600 of FIG. 6 is identified by, for example, an icon and a device name. FIG. 7 lists example icons and their associated device names as used in an embodiment of the present invention. Thus, for example, icon 701, a SynOptics switch, is the same icon as device icons 601–603 in FIG. 6.

Window 600 is comprised of pull-down menus 609; three health status panes—Critical Status pane 610, Warning Status pane 620, and Caution Status pane 630; an Acknowledge Status pane 640, which displays device icons previously displayed in one of the three health panes but which is now operational; an Operational Status pane 650, which displays icons of devices that are currently fully operational; and tools bar 660, which allows the network manager to initiate, for example, Optivity integrated application tools such as Fault Summary (FaultSum tool 663) by selecting a device icon with a mouse, dragging and dropping the icon on the appropriate tool within tools bar 660.

Menu bar 609 provides access to pull down menus to perform functions such as those described in Table 1 below:

TABLE 1

| Menu | Command | Function |
| --- | --- | --- |
| File | Load Config File | Loads devices that have been saved to window 600 |
| | Save Config File | Save devices currently in window 600 to config file |
| | Exit | Quit this fault management system application |
| View | By Name | Display only the name of network devices in window 600 |
| | By Icon | Display only the icon of network devices in window 600 |
| | By Name and Icon | Display name and icon of network device in window 600 |
| | Icon Size | Control size of icons in window 600 |
| | Device Filter | Display only certain type of device in window 600 |
| | Find | Locate a device in window 600 |
| | Summary | Pop up summary of # of devices by type and severity |
| Options | Acknowledge All | All devices in Ack pane moved to Op pane and green |
| | State Computation Preferences | Specify state computation method that fault management system is to use to calculate health of devices |
| | Send Remote Selection | If a device in window 600 selected, same device is selected in remote application. |
| | Receive Remote Selection | If a device in remote application is selected, same device selected in window 600. |

With respect to the health status panes, the overall health status of a device is determined by the (vector of severity levels) assigned to six fault categories—connectivity, error rates, components condition, load, configuration, and security. These categories can each have a value of 0–10, where 0 means that the category item is fully operational and 10 means the category item is completely nonoperational. Device icons, e.g., 601–603, are moved to the appropriate health status pane in window 600 of the present invention to indicate their current overall state. The color and location of a device icon in one of these health status panes indicates its overall health status as described in the Table 2 below:

TABLE 2

| Device Icon Color | Severity Level | Degree of Severity | Description |
| --- | --- | --- | --- |
| Green | 0 | None | Device is graphically displayed in Operational Status pane 650, which indicates that it is functioning properly according to the current state computation formula. There are no evident problems with the device. |
| Yellow | 1–3 | Low severity | Device is graphically displayed in Caution Status pane 630. This is a low severity problem but network manager may want to monitor or investigate it. |
| Orange | 4–6 | Medium severity | Device is displayed in Warning Status pane 620, which indicates that a nonfatal error or condition has occurred. The situation is not critical but network manager should monitor or investigate it. |
| Red | 7–10 | High severity | Device is displayed in Critical Status pane 610, which indicates it is in a critical condition because it has failed or is at risk of failing. Network manager must take action to remedy the situation. |

When a device icon appears in Acknowledge Status pane 640, this indicates that the status of the device has changed from critical, warning or caution to operational. Device icons appear in this status pane to ensure that the network manager is aware of the change in status. Device icons in this status pane are blue. When the network manager clicks and drags a device icon from Acknowledge Status pane 640 to Ack tool 664 in tool bar 660, the device icon is changed to green and displayed in Operational Status pane 650.

The same color Is used to represent the device Icon In other integrated applications as well, for example, Optivity views and SunNet Manager views. The average state of network devices contained In an object such as a network or LAN segment will be used to determine the color of the object icon within the view. Thus, if a segment contains two green hub icons and one orange hub icon, the segment icon will be yellow.

The tools in tools bar 660 in window 600 of one embodiment of the present invention are:

1. MonLevel tool 661: specifies the monitor level for a selected network device or object. After dragging a device icon to this tool, a monitor level dialog box is displayed, in which the network manager may select one of the following monitoring levels—none, trap, ping, or SNMP active polling, and then click OK to close the dialog box;
2. Remove tool 662: removes a selected icon from window 600;
3. FaultSum tool 663: launches a fault summary application which displays a list of faults for the network or selected device; and, 4. Ack tool 664: acknowledges that the status of a device represented by a device icon displayed in window 600 has changed. The network manager must click on the device icon and drag the icon to Ack tool 664, thereby moving the device icon from Acknowledge Status pane 640 to Operational Status pane 650, and changing the color of the icon to green.

Window 600 of the present invention allows the network manager to quickly monitor the health of critical sites or devices. In one embodiment, the present invention is operated in conjunction with other integrated network management system applications, for example, the Enterprise Command Center and Fault Summary tools available from the Optivity suite of network management system applications from Bay Networks, Incorporated. This feature, in combination with the ability to click, drag and drop icons on to tools in tools bar 660, allow the network manager to keep integrated applications running and use drag and drop techniques in which an icon in one application is selected by cursor control device 523, e.g., a mouse, and dragged and dropped in window 600 of an embodiment of the present invention to obtain current status and fault information on critical network devices and objects.

Figure 1:
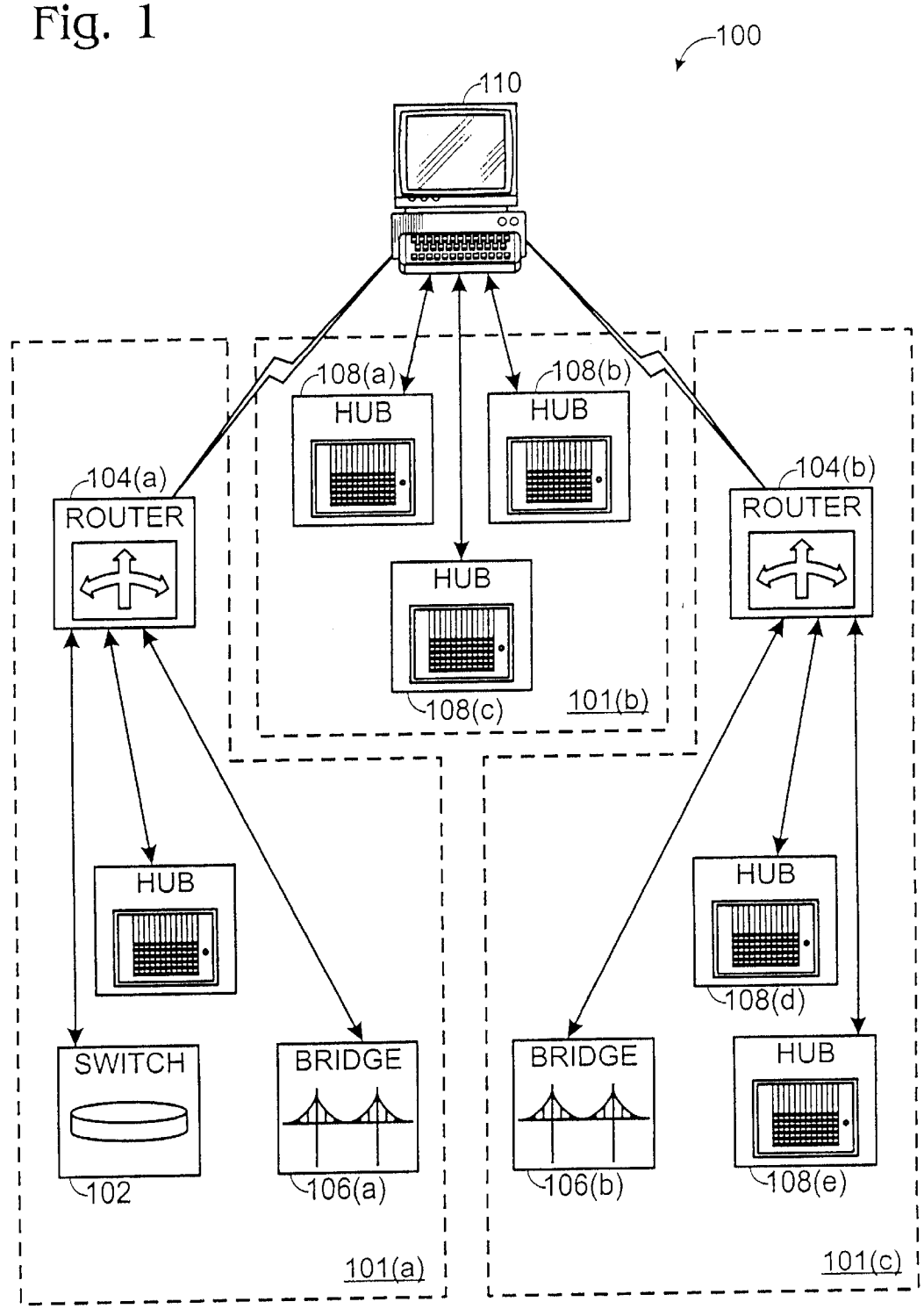
FIG. 1 is a logical diagram of an enterprise network, divided into sites.
Figure 2:
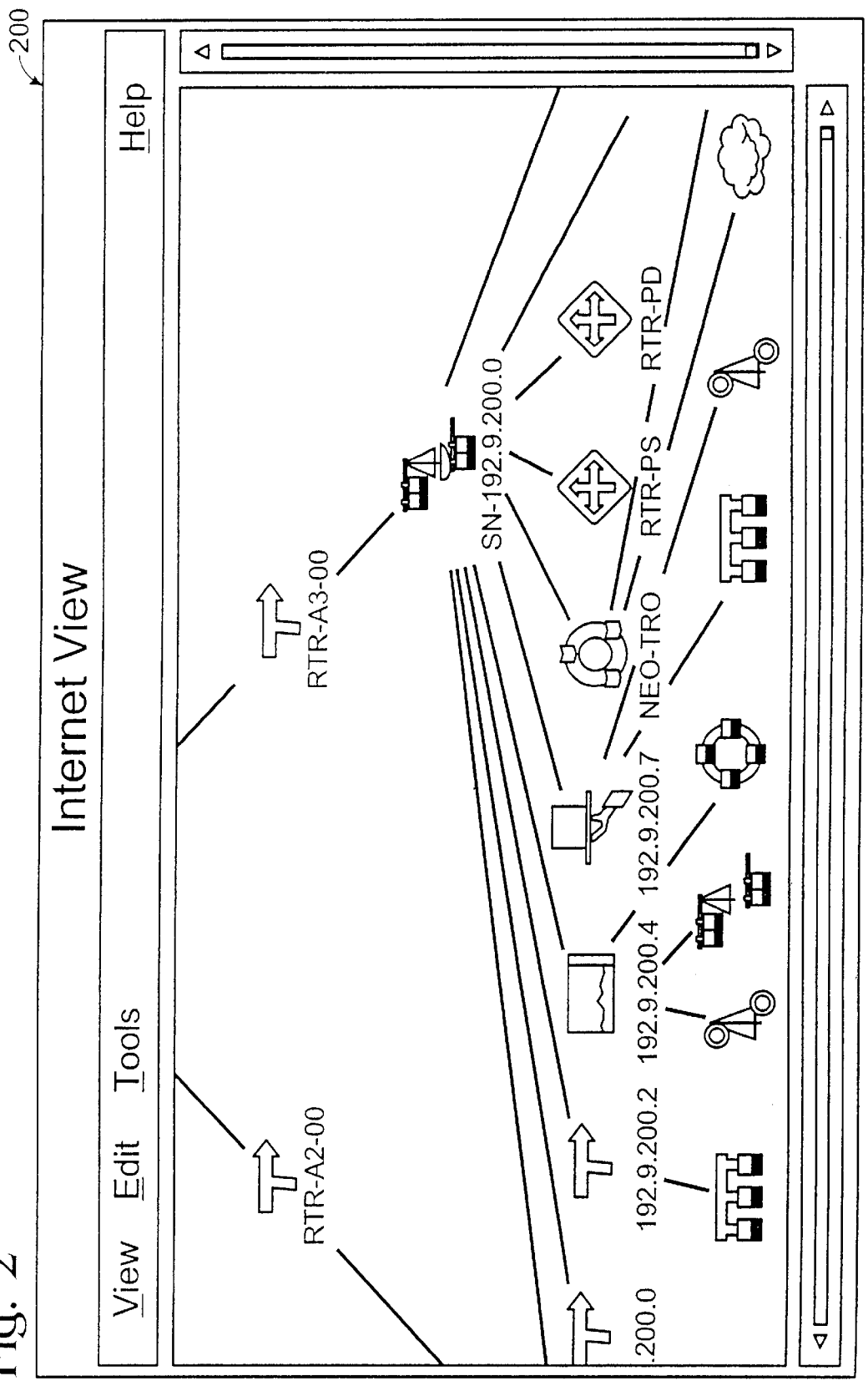
FIG. 2 is an embodiment of a topology map of an enterprise network.
Figure 3:
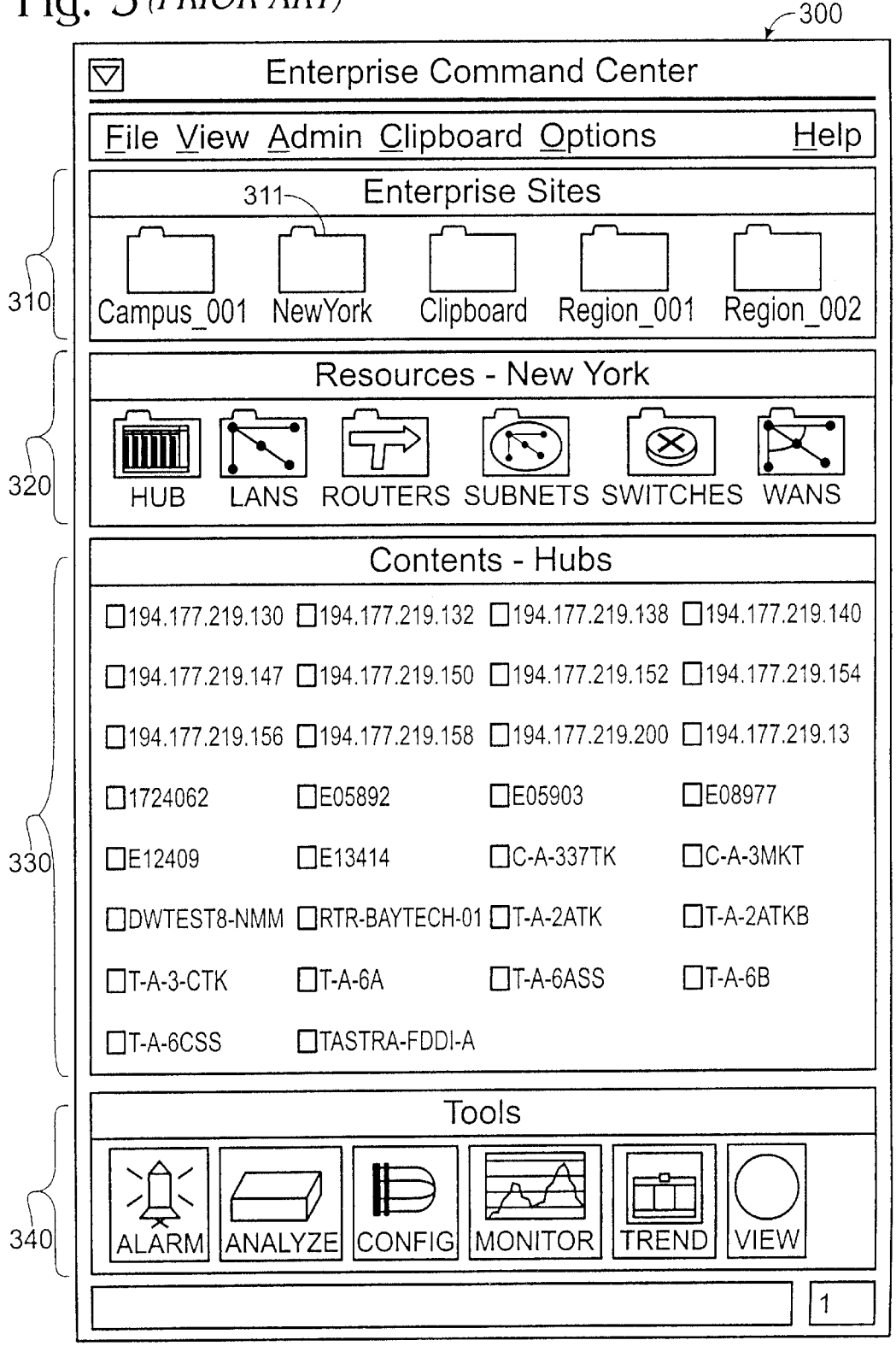
FIG. 3 is a logical, graphical representation of the resources of an enterprise network.
Figure 4:
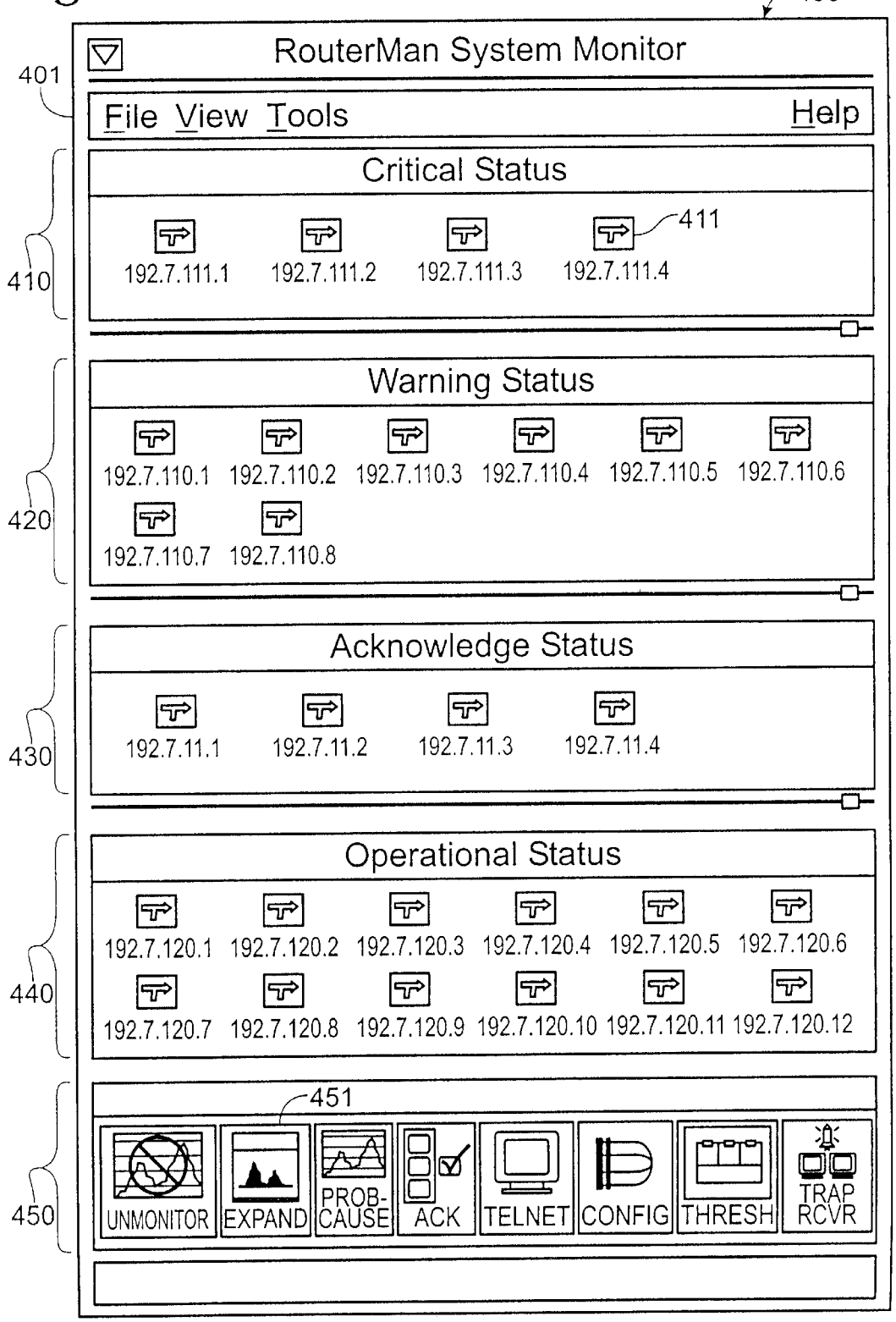
FIG. 4 is a logical, graphical representation of the health status of network devices of the same type for an enterprise network.

Referring to FIGS. 3 and 6, using such interapplication drag and drop techniques, a network manager can add new network objects to be monitored via window 600 by dragging any of the following icons from Enterprise Command Center window 300 to window 600:

1. Site icons from sites pane 310;
2. Folder icons (e.g., router, hub, or switch) from resources pane 320; and,
3. Network device or object icons (e.g., router, hub, or switch) from contents pane 330.

When an icon (e.g., site, folder or device icon) is dragged from Enterprise Command Center window 300 to window 600, device icons are displayed in the status pane that matches their status. The device icons remain displayed within the status panes of window 600 and will move between status panes according to their current status until the network manager removes them from window 600. For example, the network manager can quickly start monitoring the health of the New York headquarters by dragging site icon 311 from sites pane 310 to window 600. All device icons for all network devices in the site represented by site icon 311 are thus displayed in the appropriate status panes of window 600. As another example, if Enterprise Command Center window 300 and window 600 of the present invention are both running, i.e., both are concurrently displayed on display device 521 of the network management station, the network manager can display a list of fault reports for an entire site, network object or device by dragging an icon, for example, site icon 311, from window 300 to FaultSum tool 663 in tools bar 660. An integrated application such as Optivity's Fault Summary is thereby launched, listing fault reports for the selected devices in a pop-up summary window.

It should be noted that the dragging and dropping techniques of the present invention are state driven. That is, a network manager may only drag and drop a network device icon according to the status of the network device. Thus, referring to FIG. 6, a network manager may select network device icon 607 in acknowledge status pane 640 (wherein, in one embodiment of the present invention the device icon is colored blue) and drag the icon to Ack tool 664. As the network manager drags Icon 607 over Ack tool 664, the icon turns green, indicating the action is allowed. Icon 607 is then automatically displayed in green in Operational Status pane 650. However, for example, if device icon 603 were selected and dragged to Ack tool 664, the icon would turn red, indicating that the action is not allowed, since the device icon was not selected and dragged from Acknowledge Status pane 640.

After receiving an event from a device currently displayed in window 600 of the present invention, an integrated network management application can check its state rules to determine if it should generate a trap to the network management station and change the current state of the network object or device. Events include traps from devices and other applications, and SNMP Get packets. Every event may have a state rule associated with it. The severity of a problem is reflected in the severity level of the state rule. Thus, for example, because a power supply failure in a critical device such as a router is a critical problem it has a high severity level.

In one embodiment of the present invention, the current state of a network device or object, and, thus, the color of the device icon representing the device or object, is based, by default, on the highest of six fault categories. The network manager can, however, change which categories are used to calculate the color state and can specify-the use of an average value for the six fault categories instead of the highest value for the six fault categories.

Figure 8:
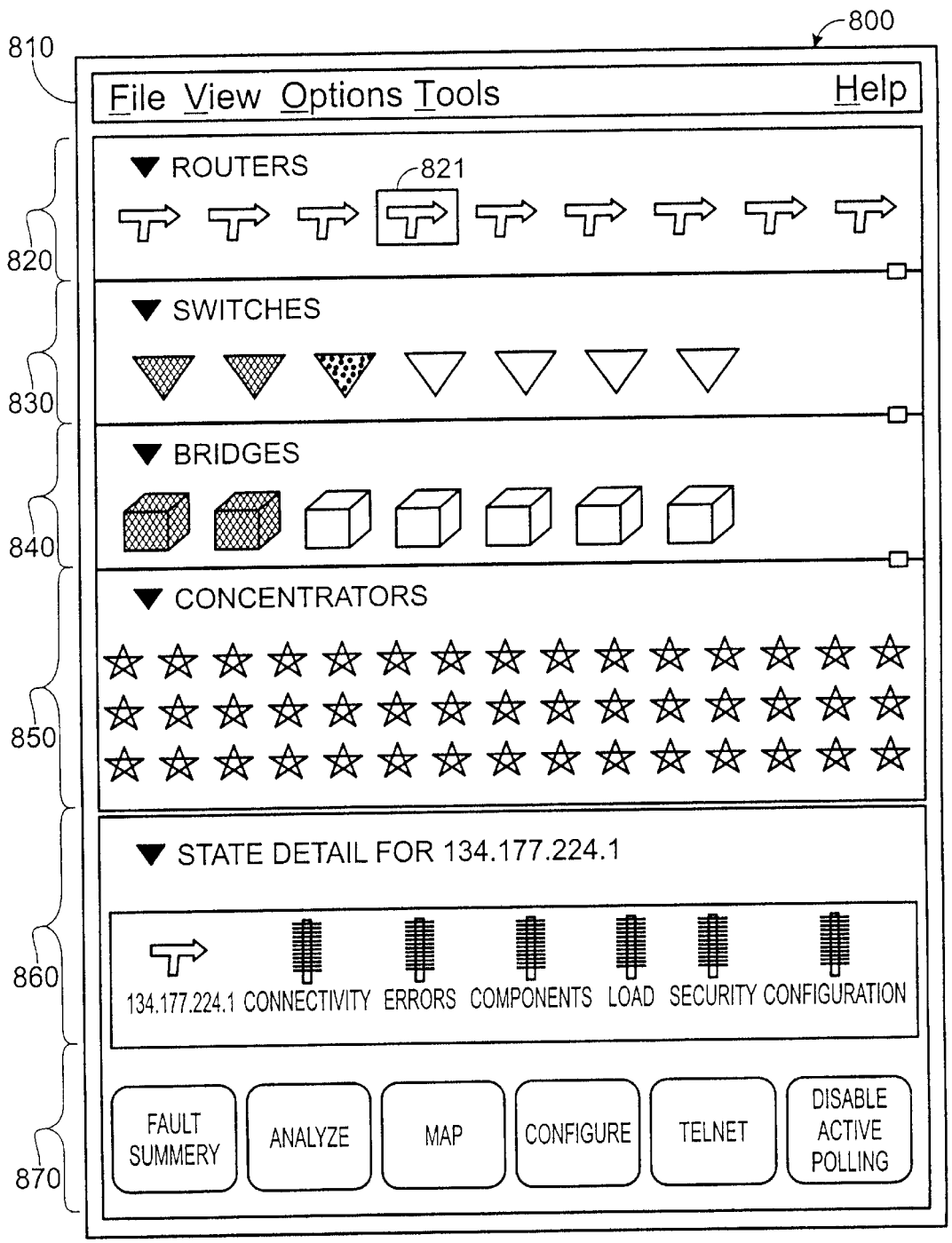
FIG. 8 is an alternative graphical user interface embodied by the present invention.

With reference to FIG. 8, a window 800 of another embodiment of the present invention is shown. While the overall health status of each network device is communicated to the network manager according to the color of the device icon representing the device, in contrast to window 600, window 800 primarily categorizes network devices into panes according to their type. Thus, for example, pane 820 maintains a view of all router icons, while pane 830 displays all switches, pane 840 displays bridges, etc. Devices may be displayed in health status order within each pane such that, for example, devices whose overall health status is critical are displayed first (upper and leftmost) and devices whose overall health status is operational are displayed last (lower and rightmost) within each pane.

As with window 600, window 800 also has a menu bar 810 and tools bar 870. In addition, however, window 800 allows the network manager to view at a glance the state of the six fault categories for a given network device by selecting the device icon representing the device, e.g., device icon 821, a router. Upon selecting device icon 821, state information for the router appears in state detail pane 860. Thus, the network manager is able to quickly glance at a depiction of the selected device's state severity levels. In the embodiment of window 800, the various state values are retrieved from a database maintained by an integrated application and are displayed in an easy to read thermometer format. If a network device or object is not selected, state detail pane 860 will not display a device icon and all the thermometers will be at zero.

Thus, a method and apparatus has been described for simultaneously displaying from a single session at a network management station the health status of all network devices and objects in an enterprise network.

We claim:

1. A network management station comprising:
   a processor to process information and create multiple types of network device icons that represent at least two different network devices; and
   a display device communicatively coupled to the processor, the display device to display a window featuring (i) a plurality of health status panes each associated with a unique severity level of health status and (ii) the multiple types of network device icons, each network device icon being displayed in one of the plurality of health status panes according to a health status of its corresponding network device, wherein the health status of a selected network device of the at least two different network devices is determined by the processor calculating a plurality of vectors of severity levels of the selected network device, the vectors of severity levels are based on health status values for a plurality of fault categories received from the selected network device.

2. The network management station of claim 1 wherein the at least two different network devices include at least one hub and at least one bridge.

3. The network management station of claim 1 wherein the at least two different network devices include at least one hub and at least one router.

4. The network management station of claim 1 wherein the at least two different network devices include at least one hub and at least one switch.

5. The network management station of claim 1 wherein the at least two different network devices include at least one bridge and at least one router.

6. The network management station of claim 1 wherein the at least two different network devices include at least one bridge and at least one switch.

7. The network management station of claim 1 wherein the at least two different network devices include at least one router and at least one switch.

8. The network management station of claim 1 further comprising a memory coupled to the processor, the memory to store the network device icons and instructions to be executed by the processor.

9. The network management station of claim 1 wherein a health status value corresponding to each of the plurality of fault categories is equal to one of (i) a first value representing that the selected network device is fully operational, (ii) a second value representing that the selected network device is completely non-operational and (iii) a third value ranging between the first value and the second value representing that the selected network device is neither fully operational nor completely non-operational.

10. The network management station of claim 1 wherein an overall health status value of a selected network device is equal to the highest value of the plurality of vector of severity levels of the selected network device.

11. The network management station of claim 1 wherein the overall health status value of a selected network device is equal to the average value of the plurality of vector of severity levels of the selected network device.

12. The network management station of claim 1 wherein the processor displays a network device icon of the selected network device in an operational status pane of the plurality of health status panes if the vector of severity levels of the selected network device is equal to the first value.

13. The network management station of claim 1 wherein the processor displays a network device icon of the selected network device in a caution status pane of the plurality of health status panes if the vector of severity levels is approximately equal to ten-to-thirty percent of the difference between the first value and the second value.

14. The network management station of claim 1 wherein the processor displays a network device icon of the selected network device in a warning status pane of the plurality of health status panes if the vector of severity levels is approximately equal to half of the difference between the first value and the second value.

15. The network management station of claim 1 wherein the processor displays a network device icon of the selected network device in a critical status pane of the plurality of health status panes if the vector of severity levels is equal to at least two-thirds of the difference between the first value and the second value.

16. The network management station of claim 1 wherein the health status of a selected network device of the at least two different network devices is determined based on a fault category information gathered from the selected network device that indicates whether the selected network device is fully operational, completely non-operational or somewhere in between.

17. A computer program product embodied on a computer-readable medium for gathering and simultaneously displaying a health status information for at least two different network devices from a single session, comprising:
 a first application for displaying a window featuring a plurality of health status panes each associated with a unique severity level of health status; and
 a second application for displaying a plurality of types of network device icons, each network device icon being displayed within one of the plurality of health status panes according to an overall health status of its corresponding network device.

18. The computer program product of claim 17, further comprising:
 a third application for determining the health status of a selected network device of the at least two different network devices by calculating a vector of severity levels of a selected network device, the vector of severity levels being based on health status values for a plurality of fault categories received from the selected network device.

19. The computer program product of claim 17, wherein a health status value corresponding to each of the plurality of fault categories as determined by the third application is equal to one of (i) a first value representing that the selected network device is fully operational, (ii) a second value representing that the selected network device is completely non-operational and (iii) a third value ranging between the first value and the second value representing that the selected network device is neither fully operational nor completely non-operational .

20. The computer program product of claim 17 further comprising:
 a third application for moving a network device icon representing a selected network device of the at least two network devices from one health status pane to another when the overall health status level of the selected network device increases or decreases.

21. A method of gathering and displaying a health status information for at least two different network devices, comprising:
 determining the health status of the at least two network devices according to a vector of severity levels;
 displaying a window having a plurality of panes on a display device;
 displaying a network device icon in one of the plurality of panes according to the vector of severity levels calculated for the network device represented by the network device icon; and
 moving the network device icon from one of the plurality of panes to another when the vector of severity levels changes from a first value to a second value.

22. The method of claim 21, wherein prior to determining the health status of the at least two network devices, the method further comprises;

monitoring a plurality of fault categories from the at least two different network devices;

assigning a first health status value if the fault category is fully operational;

assigning a second health status value if the fault category is completely nonoperational;

assigning a third health status value ranging between the first value and the second value if the fault category is neither fully operational nor completely nonoperational;

calculating a vector of severity levels assigned to each of the fault categories; and determining an overall health status value of a selected network device according to a user-selectable criteria.

23. The method of claim 21 further comprising;

assigning a color to each pane depending on a unique health status the pane represents; and displaying the network device icon in the same color assigned to the pane in which the network device icon is displayed.

24. A method of providing health status information for network devices, the method comprising:

displaying a window having a plurality of panes on a display device;

displaying at least two network devices in the panes depending on a vector of severity levels;

displaying a tool bar having at least one tool application on the window;

selecting the network device icon from one of the pluralities of the panes and dragging and dropping the network device icon onto the tool application; and launching an application associated with the tool application and displaying additional health status information about the selected network device in a pop-up window.

25. The method of claim 24 wherein, the at least one application is a tool that, when executed, displays a monitor level dialog box, selects one of a plurality of types of monitoring levels, and uses the selected type of monitoring level to monitor the selected network device.

26. The method of claim 24 wherein the at least one tool application is a tool, the selection of which launches a fault summary application which displays a list of faults for the selected network device.

27. An apparatus for gathering and displaying a health status information for at least two different network devices, comprising:

means for determining the health status of the at least two network devices according to a vector of severity levels;

means for displaying a window having a plurality of panes on a display device;

means for displaying a network device icon in one of the plurality of panes according to the vector of severity levels calculated for the network device represented by the network device icon; and means for moving the network device icon from one of the plurality of panes to another when the vector of severity levels changes from a first value to a second value.

* * * * *